US012618356B2

(12) United States Patent
Tanaka et al.

(10) Patent No.: US 12,618,356 B2

(45) Date of Patent: May 5, 2026

(54) CYLINDER HEAD STRUCTURE

(71) Applicant: KUBOTA Corporation, Osaka (JP)

(72) Inventors: Tamon Tanaka, Sakai (JP); Junya Ikai, Sakai (JP); Kyota Inoue, Sakai (JP); Atsushi Tanaka, Sakai (JP); Kazuyuki Chuma, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/863,468

(22) PCT Filed: Apr. 3, 2023

(86) PCT No.: PCT/JP2023/013793

§ 371 (c)(1),
(2) Date: Nov. 6, 2024

(87) PCT Pub. No.: WO2024/004308

PCT Pub. Date: Jan. 4, 2024

(65) Prior Publication Data

US 2025/0314192 A1 Oct. 9, 2025

(30) Foreign Application Priority Data

Jun. 30, 2022 (JP) ................................ 2022-105562

(51) Int. Cl.

*F01P 3/02* (2006.01)
*F02F 1/10* (2006.01)

(Continued)

(52) U.S. Cl.

CPC *F01P 3/02* (2013.01); *F02F 1/10* (2013.01); *F02F 1/36* (2013.01); *F02F 11/002* (2013.01);

(Continued)

(58) Field of Classification Search

CPC .. F01P 3/02; F01P 2003/021; F01P 2003/024; F02F 1/10; F02F 1/36; F02F 11/002

See application file for complete search history.

(56) References Cited

U.S. PATENT DOCUMENTS 4,660,527 A * 4/1987 Tanaka ...................... F02F 1/40 123/193.5
5,086,733 A * 2/1992 Inoue ...................... F02F 1/108 123/41.79
2003/0056738 A1 3/2003 Aketa et al.

FOREIGN PATENT DOCUMENTS

JP S60090957 A 5/1985
JP S60192857 A 10/1985

(Continued)

OTHER PUBLICATIONS

Amendment filed with the Japanese Patent Office on Feb. 20, 2024, in JP Application No. 2022105562.

(Continued)

*Primary Examiner* — Hung Q Nguyen
(74) *Attorney, Agent, or Firm* — Panitch Schwarze Belisario & Nadel LLP

(57) ABSTRACT

A cylinder head structure that can increase the rigidity of an area corresponding to an area between cylinder bores and improve a sealing force of an inter-bore corresponding portion positioned above between adjacent cylinders when enhancing the sealing force between a cylinder block and the cylinder head to improve engine output. The cylinder head structure includes: insertion walls through which right and left fastening bolts arranged between adjacent cylinders pass; a head upper wall connecting upper end portions of a pair of the insertion walls; and a cylinder head bottom wall, and a head cooling water channel is surrounded by those four walls (insertion walls, head upper wall, cylinder head bottom wall), and a vertical wall in a state of extending left (Continued)

and right spanning the head upper wall and the cylinder head bottom wall to block the head cooling water channel is formed between the pair of insertion walls.

4 Claims, 5 Drawing Sheets

(51) Int. Cl.
*F02F 1/36* (2006.01)
*F02F 11/00* (2006.01)
(52) U.S. Cl.
CPC ... *F01P 2003/021* (2013.01); *F01P 2003/024* (2013.01)

(56) References Cited

FOREIGN PATENT DOCUMENTS

| | | | | | |
|---|---|---|---|---|---|
| JP | S62117255 U | | 7/1987 | | |
| JP | S63171643 U | | 11/1988 | | |
| JP | 2003097347 A | | 4/2003 | | |
| JP | 2009293575 A | * | 12/2009 | ................ | F01P 3/02 |
| JP | 2015108346 A | | 6/2015 | | |
| WO | WO-2005042957 A1 | * | 5/2005 | ................ | F02F 1/10 |
| WO | WO-2007020982 A1 | * | 2/2007 | ................ | F01P 3/16 |
| WO | WO-2016067653 A1 | * | 5/2016 | ............ | F02F 11/002 |

OTHER PUBLICATIONS

Decision to Grant issued on Mar. 26, 2024, in JP Application No. 2022105562.
International Search Report issued on May 23, 2023, in International Application No. PCT/JP2023/013793.
Notice of Reasons for Refusal issued on Feb. 7, 2024, in JP Application No. 2022105562.
Written Opinion issued on Feb. 20, 2024, in JP Application No. 2022105562.

* cited by examiner

CYLINDER HEAD STRUCTURE

CROSS-REFERENCE TO RELATED APPLICATIONS

This application is a Section 371 of International Application No PCT/JP2023/013793, filed Apr. 3, 2023, which was published in the Japanese language on Jan. 4, 2024, under International Publication No. WO 2024/004308 A1, which claims priority under 35 U.S.C. § 119 (b) to Japanese Application No. 2022-105562, filed Jun. 30, 2022, the disclosures of each of which are incorporated herein by reference.

TECHNICAL FIELD

The present invention relates to a cylinder head assembled on a cylinder block by a plurality of fastening bolts.

BACKGROUND ART

It is common for a water-cooled multicylinder diesel engine or the like to adopt a structure in which cooling water discharged from a water pump is sent to a cooling water channel of a cylinder block (cylinder), and cooling water rises from a cooling water channel around each cylinder bore of the cylinder block into a cooling water channel of a cylinder head, as disclosed in Patent Document 1, for example.

The cylinder block and the cylinder head are assembled across a gasket. However, since the width between the cylinder and the cylinder, that is, between the cylinder bores is narrow and the width of the gasket is also inevitably narrow, the sealing force of a combustion gas is likely to decrease.

The part between the adjacent fastening bolts in the cylinder head has a hollow cross section due to the presence of the cooling water channel, and the rigidity is likely to decrease. In particular, between a pair of fastening bolts across adjacent cylinder bores in a cylinder block (see FIG. 4 of Patent Document 2), an axial force of the fastening bolts is less likely to be transmitted to the gasket through the cylinder head, and a gasket pressing force decreases, which may lead to a decrease in a sealing force.

PRIOR ART DOCUMENTS

Patent Documents

Patent Document 1: Japanese Patent Application Laid-open No. 2003-97347

Patent Document 2: Japanese Patent Application Laid-open No. 2015-108346 (FIG. 4)

SUMMARY OF THE INVENTION

Problems to be Solved by the Invention

With recent improvement in performance, increasing the output of an engine without changing the interval between cylinders and the cylinder diameter naturally leads to an increase in combustion pressure. Therefore, it is necessary to further increase the sealing force between adjacent cylinders, but the above-described conventional technique has a limit, and further elaboration is required.

An object of the present invention is to provide a cylinder head structure that can increase the rigidity of an inter-bore corresponding portion positioned above between adjacent cylinders in a cylinder head and easily improve the sealing force of the inter-bore corresponding portion when enhancing the sealing force between a cylinder block and the cylinder head to improve the output of an engine.

Solutions to the Problems

The present invention is characterized in that in a cylinder head structure,

- a cylinder head is assembled on a cylinder block by a plurality of fastening bolts,
- the cylinder head is provided with an insertion wall through which the fastening bolts arranged on both sides between adjacent cylinders in the cylinder block pass, a head upper wall coupling upper end portions of a pair of insertion walls, and a cylinder head bottom wall, and
- a cooling water channel surrounded by the pair of insertion walls, the head upper wall, and the cylinder head bottom wall is provided with a vertical wall spanning the head upper wall and the cylinder head bottom wall.

Effects of the Invention

According to the present invention, since the vertical wall is newly provided between the pair of insertion walls, the length between the pair of insertion walls is greatly shortened (the length of the beam when the head upper wall is analogized as a double cantilever beam is greatly reduced), and therefore the strength and rigidity of the inter-bore corresponding portion positioned above between adjacent cylinders in the cylinder head can be greatly improved.

An axial force due to the fastening of the fastening bolts passing through the pair of insertion walls is guided not only through each insertion wall but also through the head upper wall and the cylinder head bottom wall, and the axial force is transmitted to the cylinder head as evenly as possible as compared with a conventional structure without a vertical wall. Therefore, the axial force guided between the pair of fastening bolts is substantively increased, and the sealing properties between a cylinder block and the cylinder head can be greatly improved.

As a result, it is possible to provide a cylinder head structure that can increase the rigidity of an inter-bore corresponding portion positioned above between adjacent cylinders in a cylinder head and easily improve the sealing force of the inter-bore corresponding portion when enhancing the sealing force between a cylinder block and the cylinder head to improve the output of an engine.

EMBODIMENTS OF THE INVENTION

Figure 5:
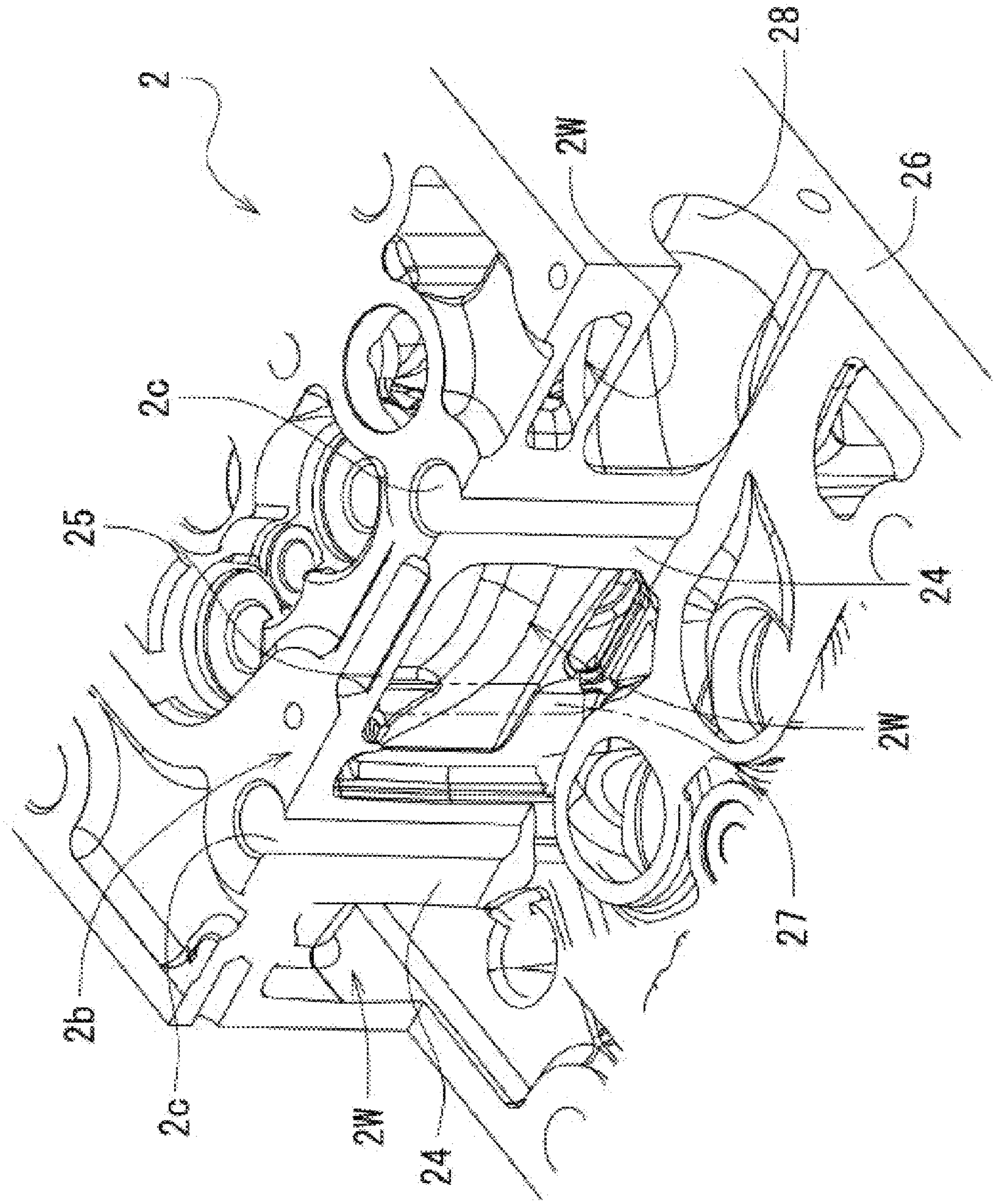
FIG. 5 is a partially cutout perspective view showing an inter-bore corresponding part of the cylinder head as viewed obliquely from above.

Embodiments of a cylinder head structure according to the present invention will be described below with reference to the drawings regarding a case of an industrial diesel engine. Note that in an industrial diesel engine (hereinafter, abbreviated as engine) E, the side provided with a cooling fan 10 is the front, the side provided with a flywheel 7 is the rear, the side provided with an intake port 30 [side provided with an intake manifold (not shown)] is the right, and an exhaust port 28 [side provided with an exhaust manifold (not shown)] is the left. In FIG. 5, a vertical wall 27 is added in an imaginary line to a conventional structure.

Figure 1:
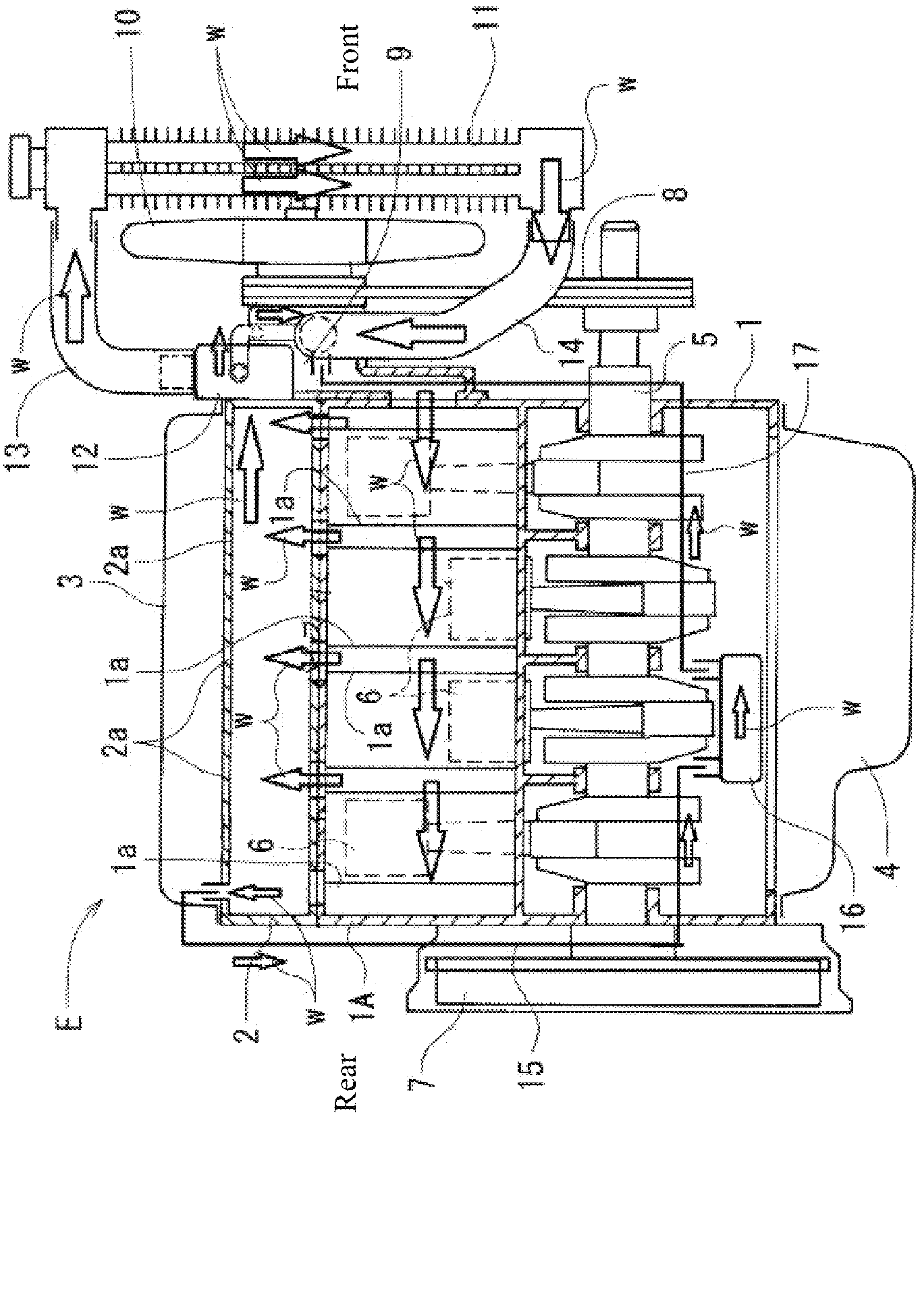
FIG. 1 is a side view of an outline of an engine showing a transfer structure of cooling water.

As shown in FIG. 1, a straight-four (multicylinder) engine E has a cylinder head 2 assembled on a cylinder block 1, a head cover 3 assembled on the cylinder head 2, and an oil pan 4 assembled under the cylinder block 1. 5 denotes a crankshaft, 6 denotes a piston, 7 denotes a flywheel, 8 denotes a transmission belt, 9 denotes a water pump, 10 denotes a cooling fan, and 11 denotes a radiator. An upper portion of the cylinder block 1 is formed in a cylinder portion 1A embedding the piston 6.

Cooling water w in a cooling device of this engine E generally flows in the following order. That is, as shown in FIG. 1, the water pump 9→the cylinder portion 1A of cylinder block 1→the cylinder head 2→a thermostat 12→an upper hose 13→the radiator 11→a lower hose 14→the water pump 9. There is also a route in which part of the cooling water w cools an oil cooler 16 from the cylinder head 2 through a supply passage 15 that is a dedicated route, and then returns to the water pump 9 through an exhaust passage 17.

The cooling water w entering the cylinder portion 1A from the front flows also upward for each cylinder 1*a* while flowing rearward basically. Therefore, the cooling water w flows in upward from a cylinder cooling water channel 1W, which is a water jacket of the cylinder portion 1A, into a head cooling water channel 2W, which is a water jacket of the cylinder head 2, and flows from the rear to the front (to the water pump 9 of the front).

As shown in FIG. 2(A), between the adjacent cylinders 1*a* and 1*a* of the cylinder portion 1A, a lower coupling wall 18, a middle coupling wall 19, and an upper coupling wall 20 that connect and integrate the adjacent cylinders 1*a* and 1*a* are provided in a state of crossing the cylinder cooling water channel 1W. The head cooling water channel 2W of the cylinder head 2 and the cylinder cooling water channel 1W of the cylinder portion 1A communicate with each other at a plurality of locations on an outside site of each cylinder 1*a*, and communicate with each other by two communication holes 21 and 22 on left and right positions between the adjacent cylinders 1*a* and 1*a* (between bores). The head cooling water channel 2W includes an inter-insertion-wall head cooling water channel 2Wa.

Figure 4:
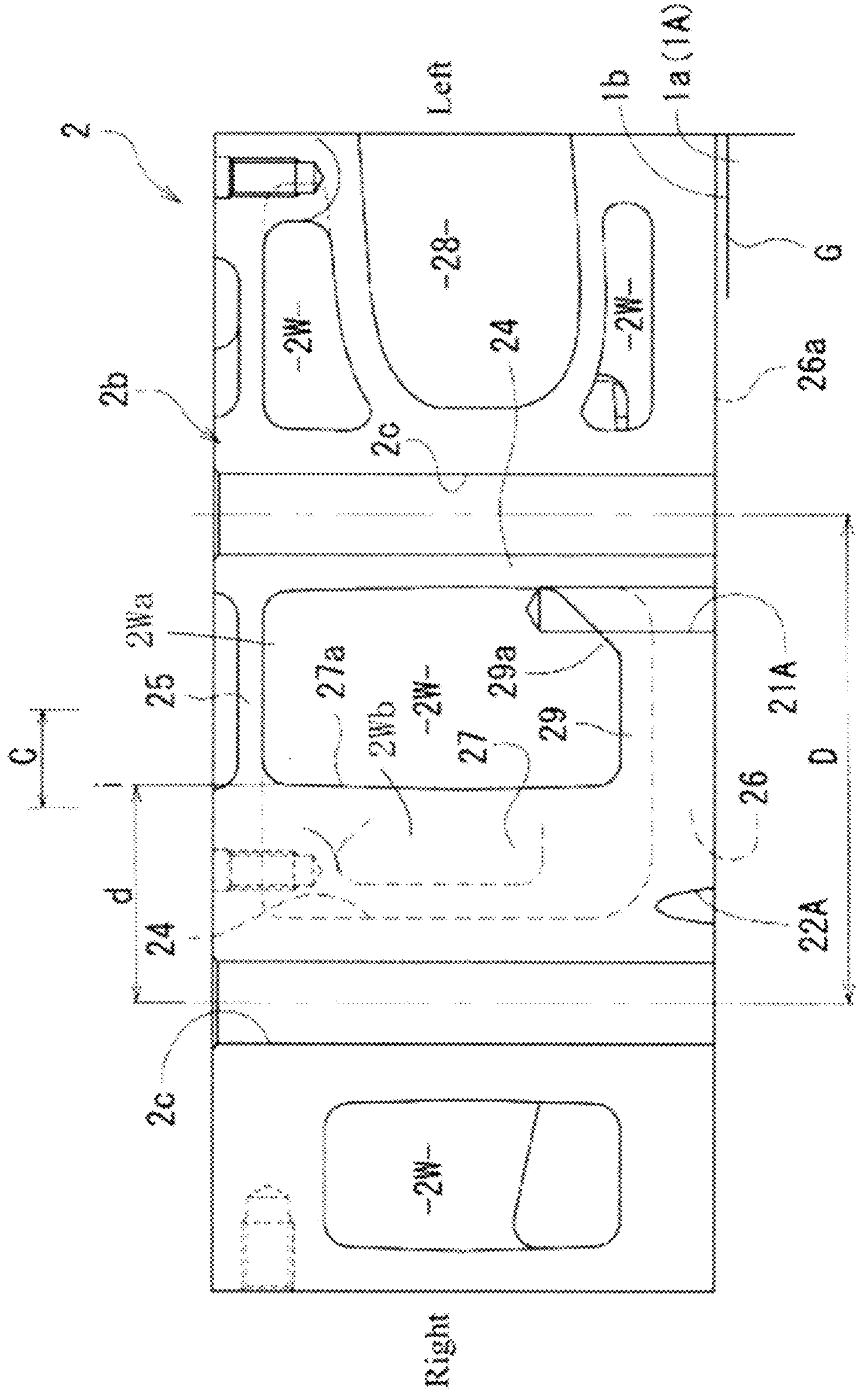
FIG. 4 is a cross-sectional view taken along line Z-Z of FIG. 3 (transverse cross-sectional view showing an inter-bore corresponding part).

As shown in FIGS. 1 and 5, the head cooling water channel 2W through which the cooling water w passes is internally formed in the cylinder head 2, and an inter-bore corresponding portion (also called "inter-cylinder portion") 2*b* positioned above between the adjacent cylinders 1*a* and 1*a* in the cylinder head 2 is shown in FIGS. 2(A) and 4. In an inter-bore corresponding portion 2*b*, an area between a pair of left and right insertion walls 24 having an insertion hole 2*c* through which a fastening bolt 23 passes, the area surrounded by a cylinder head bottom wall 26 and a head upper wall 25, is formed in the head cooling water channel 2W.

A bottom surface 26*a* of the cylinder head bottom wall 26 is a surface placed on an upper surface 1*b* of the cylinder portion 1A via a gasket G, and the head upper wall 25 is an upper wall of a cylinder head on which the head cover 3 is placed. Note that 28 in FIGS. 3 to 5 denotes an exhaust port, and the head cooling water channel 2W is formed also at each of its upper and lower areas and the right side of the right insertion wall 24.

Figure 2:
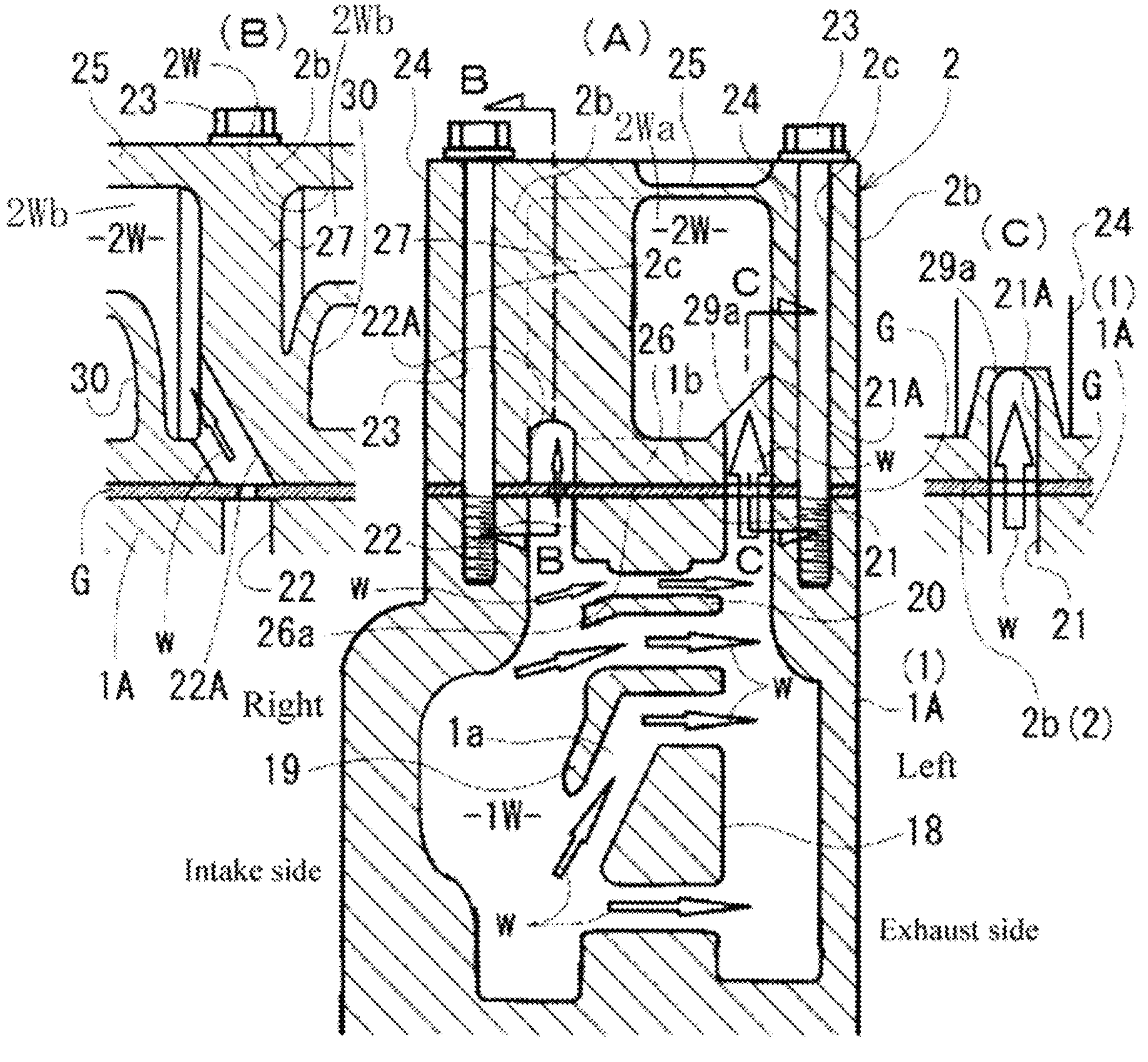
FIG. 2 shows an outline structure of between cylinder bores, and (A) is a longitudinal cross-sectional view, (B) is a cross-sectional view taken along line B-B of (A), and (C) is a cross-sectional view taken along line C-C of (A).

That is, as shown in FIGS. 2 to 5, the cylinder head 2 assembled on the cylinder block 1 by the plurality of fastening bolts 23 is provided with the insertion walls 24 and 24 for passing the fastening bolts 23 and 23 arranged on both sides between the adjacent cylinders 1*a* and 1*a* in the cylinder block 1, the head upper wall 25 coupling the upper end portions of the pair of insertion walls 24 and 24, and the cylinder head bottom wall 26, the head cooling water channel 2W surrounded by the pair of insertion walls 24 and 24, the head upper wall 25, and the cylinder head bottom wall 26 is formed, and the vertical wall 27 in a state of spanning the head upper wall 25 and the cylinder head bottom wall 26 and extending in a direction coupling the pair of insertion walls 24 and 24 to block the head cooling water channel 2W is formed between the pair of insertion walls 24 and 24. As shown in FIG. 2 (B), the vertical wall 27 divides a pair of section head cooling water channels 2Wb into front and rear channels.

Figure 3:
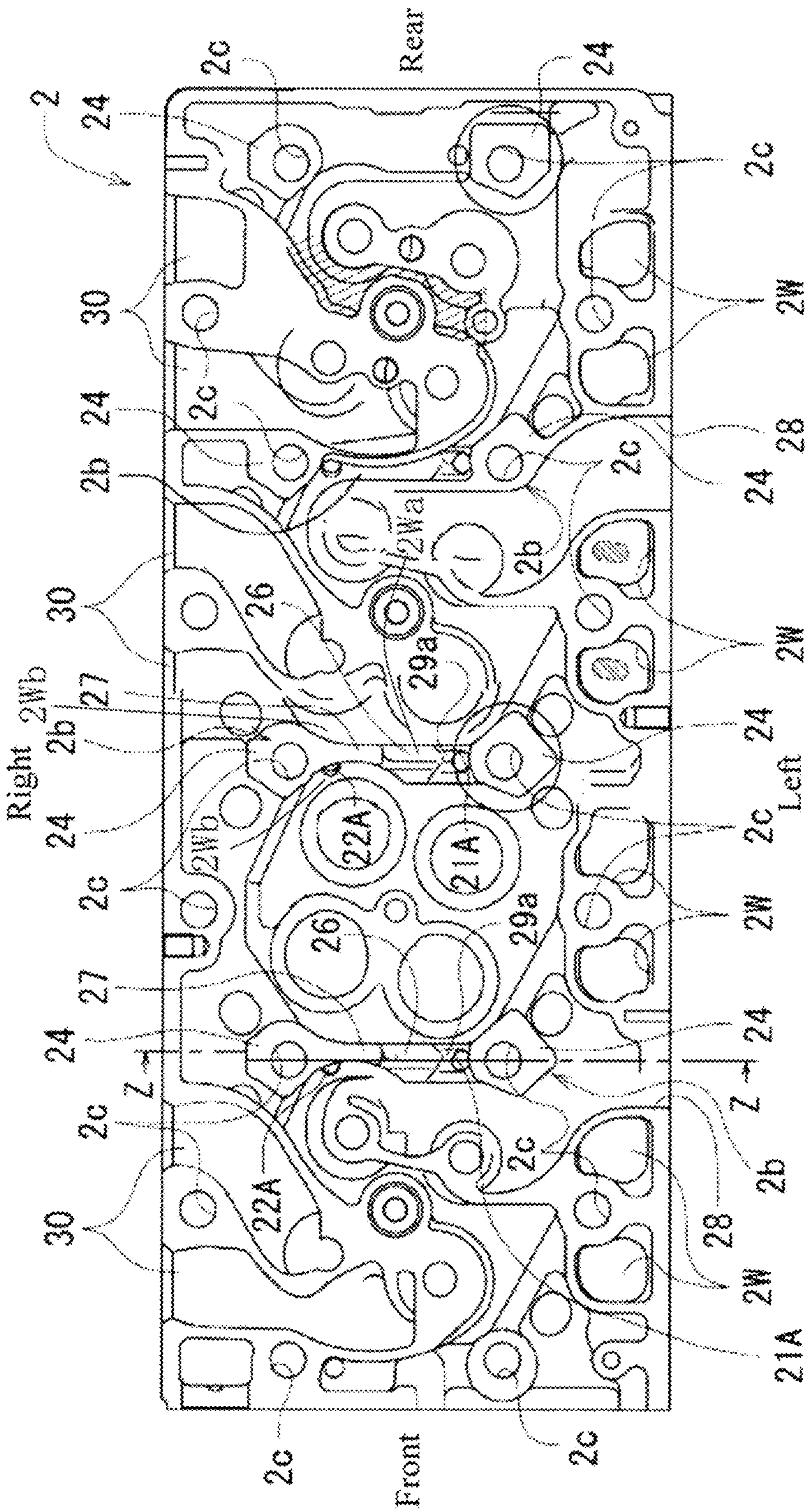
FIG. 3 is a plan view of a cylinder head.

As shown in FIGS. 2(A), 3, and 4, the vertical wall 27 is continuously connected to and integrated with the left end of the right (intake port side) insertion wall 24, and a position i in the left-right direction of a left end (end on the side not connected to the insertion wall 24) 27*a* of the vertical wall 27 is formed in a state of being present in a center region C between the pair of insertion walls 24 and 24. Examples of the range of the center region C include ±10% (C: $0.4D \leq i < 0.6D$) of left and right centers of the left and right insertion walls 24 where the center-to-center distance between the left and right insertion walls 24 is D, but may include a range other than the above (such as a range of 30% to 70%).

Where the left-right width of the vertical wall 27 is a length d between the center of the right insertion wall 24 and the left end 27*a*, the length d of the vertical wall 27 is set to an interval between the pair of insertion walls 24 and 24, that is, a length ($0.4D \leq d \leq 0.6D$) about half of the center-to-center distance D. As shown in FIG. 4, it is advantageous to form a reinforcing wall 29 extending left-right (in a direction connecting the pair of insertion walls 24 and 24) in an upward protrusion rib shape on the cylinder head bottom wall 26 in the inter-bore corresponding portion 2*b*.

A left end portion of the reinforcing wall 29 is continuous to the left insertion wall 24 while rising obliquely upward, and a vertical hole water channel (cooling water channel in a hole shape) 21A is formed in an oblique reinforcing wall portion 29*a* [see FIGS. 2(A), 2(C), and 4]. The vertical hole water channel 21A is communicated with the communication hole 21 on the left side of the cylinder portion 1A across the gasket G, and the vertical hole water channel 21A and the communication hole 21 causes the cylinder cooling water channel 1W and the head cooling water channel 2W to be communicated up and down.

As shown in FIGS. 2(A), 2(B), and 4, the head cooling water channel 2W on the front (one) side of the vertical wall 27 and the bottom surface 26*a* immediately below, that is, immediately below the vertical wall 27 are communicated with each other by an oblique hole water channel 22A formed to extend forward and upward from the bottom surface 26*a*. That is, the oblique hole water channel 22A (cooling water channel in an oblique hole shape) spanning the head cooling water channel 2W on one side partitioned by the vertical wall 27 and the lower end of the vertical wall 27 or the bottom surface 26*a* of the cylinder head bottom wall 26 on the other side is provided in the lower portion of the vertical wall 27. The cylinder cooling water channel 1W and the head cooling water channel 2W are also communicated with each other up and down by the oblique hole water channel 22A and the communication hole 22 on the right side, which communicate with each other across the gasket G.

[Regarding Actions and Effects]

Conventionally, although illustration is omitted, the inter-bore corresponding portion 2*b* of the cylinder head has a structure without the vertical wall 27 in order to widely ensure the head cooling water channel 2W (see FIG. 4 of Patent Document 1), which is disadvantageous in strength and rigidity, and has a tendency that the axial force due to the tightening of the fastening bolts 23 is less likely to be uniformly transmitted to the cylinder head bottom wall 26. Therefore, it was also attempted to provide the cylinder head bottom wall 26 with a rib wall (such as the reinforcing wall 29) protruding upward, but improvement in strength and rigidity was not sufficient, and there was a limit.

Therefore, in the present invention, the vertical wall 27 in a state of spanning the head upper wall 25 and the cylinder head bottom wall 26 and extending in a direction coupling the pair of insertion walls 24 and 24 to block the head cooling water channel 2W is formed between the pair of insertion walls 24 and 24. Since the vertical wall 27, which is newly provided, greatly shortens the length between the insertion walls 24 and 24 [the length (span) of the beam when the head upper wall 25 is analogized as a double cantilever beam extending left and right is greatly reduced], the strength and rigidity of the inter-bore corresponding portion 2*b* can be greatly improved.

That is, since the axial force of the fastening bolts 23 and 23 passed through the pair of insertion walls 24 and 24 is guided through the vertical wall 27 in contact with a bolt seat surface, the axial force is transmitted to the cylinder head 2 as evenly as possible as compared with the conventional structure without the vertical wall 27. Therefore, the axial force guided between the pair of fastening bolts 23 and 23 is substantively increased, and the sealing properties between the cylinder portion 1A and the cylinder head 2 can be greatly improved.

In a configuration in which the left end 27*a* of the vertical wall 27 integrated with the right insertion wall 24 is set in a state of being present in the center region C between the pair of insertion walls 24 and 24 (see FIG. 4), the interval between the pair of insertion walls 24 and 24 is roughly halved (the length of the beam is halved), and therefore the strength and rigidity of the inter-bore corresponding portion 2*b* can be further improved.

Since the oblique hole water channel 22A inclined forward or rearward is formed in the lower portion of the vertical wall 27, the lower side (bottom surface 26*a*) of the vertical wall 27 and the head cooling water channel 2W on the front or rear side of the vertical wall 27 can be easily communicated with each other even though the vertical wall 27 is provided, and a smooth flow of the cooling water w can be obtained. On the side without the vertical wall 27 in the inter-bore corresponding portion 2*b*, the vertical hole water channel 21A causing the lower side (bottom surface 26*a*) of the vertical wall 27 and the head cooling water channel 2W to communicate with each other is formed in the reinforcing wall portion 29*a*, and therefore it is elaborated not to cause a decrease in strength and rigidity due to the provision of the vertical hole water channel 21A.

Since the vertical wall 27 is provided to be biased to the right side of the engine E, that is, the intake port side (intake manifold arrangement side), the exhaust port side where the temperature tends to be high is not provided with the vertical wall 27, and the cooling water w easily moves through the head cooling water channel 2W in the front-rear direction (cylinder arrangement direction), and thus there is an advantage that heat can be efficiently absorbed from the exhaust side.

Other Embodiments (1) The vertical wall 27 may be provided close to the left side so as to be integrated with the left side (exhaust port side) insertion wall 24. (2) The vertical wall 27 may be provided independently at the left and right center portion between the pair of insertion walls 24 and 24, and in this case, a hole-shaped cooling water channel can be provided vertically (up and down) between the vertical wall 27 and each of the left and right insertion walls 24 and 24.

(3) The oblique hole water channel 22A may be formed as an oblique hole causing the head cooling water channel 2W on the rear side of the vertical wall 27 and the bottom surface 26*a* on the front side of the vertical wall 27 to communicate with each other. (4) The reinforcing wall 29 having a rib shape is not depicted in FIG. 2(A) but depicted in FIG. 4. The reinforcing wall 29 is not necessarily provided, but is preferably provided.

DESCRIPTION OF REFERENCE SIGNS

1: Cylinder block
1*a*: Cylinder
2: Cylinder head
2W: Head cooling water channel
21A: Cooling water channel having hole shape
22A: Cooling water channel having oblique hole shape
23: Fastening bolt
24: Insertion wall
25: Head upper wall
26: Cylinder head bottom wall
26*a*: Bottom surface
27: Vertical wall
27*a*: End
29*a*: Reinforcing wall portion

The invention claimed is:

1. A cylinder head structure, wherein, as a front-rear direction is defined by a longitudinal direction of a cylinder head, and a lateral direction is defined by a width direction of the cylinder head intersecting the front-rear direction, the cylinder head assembled on a cylinder block by a plurality of fastening bolts is provided with insertion walls through which the fastening bolts arranged on both sides in the lateral direction between adjacent cylinders in the cylinder block pass, a head upper wall coupling upper end portions of a pair of said insertion walls, a cylinder head bottom wall, a head cooling water channel, and a vertical wall, the head cooling water channel runs along the front-rear direction, one side in the lateral direction is defined as an intake side and another side in the lateral direction is defined as an exhaust side, the head cooling water channel includes an inter-insertion-wall head cooling water channel with the vertical wall being internally mounted and a pair of section head cooling water channels divided into front and rear by the vertical wall, the inter-insertion-wall head cooling water channel is surrounded by the pair of said insertion walls, the head upper wall, and the cylinder head bottom wall is formed, and the vertical wall is formed between the pair of said insertion walls in a state of spanning the head upper wall and the cylinder head bottom wall and extending in the lateral direction coupling the pair of said insertion walls to block the head cooling water channel, and the pair of section head cooling water channels communicate each other through the inter-insertion-wall head cooling water channel, the vertical wall is formed in a state of being present in a center region between the pair of said insertion walls, and the vertical wall is connected to and integrated with the insertion wall on the intake side out of the pair of said insertion walls.

2. The cylinder head structure according to claim 1, wherein an end of the vertical wall on a side not connected to the insertion wall is formed in a state of being present in a center region between the pair of said insertion walls.

3. The cylinder head structure according to claim 1, wherein an oblique hole water channel spanning the section head cooling water channel on one side and a bottom surface of the cylinder head bottom wall immediately below the vertical wall or on an other side is provided in a lower portion of the vertical wall, and cooling water on the intake side of the cylinder cooling water channel is introduced into the section head cooling water channel on one side which is arranged on the intake side of the head cooling water channel through the oblique hole water channel.

4. The cylinder head structure according to claim 1, wherein a reinforcing wall portion having an upward protrusion rib shape extending in a direction coupling the pair of said insertion walls, and a cooling water channel having a hole shape penetrating the reinforcing wall portion up and down are formed on the cylinder head bottom wall.

* * * * *